(12) United States Patent
Koizumi et al.

(10) Patent No.: US 6,393,051 B1
(45) Date of Patent: May 21, 2002

(54) DIGITAL SUBSCRIBER LINE COMMUNICATING SYSTEM AND A TRANSCEIVER IN THE SYSTEM

(75) Inventors: Nobukazu Koizumi; Seiji Miyoshi; Takashi Sasaki; Kazutomo Hasegawa, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/343,668

(22) Filed: Jun. 29, 1999

(30) Foreign Application Priority Data

Jun. 30, 1998 (JP) .......................................... 10-183518

(51) Int. Cl.$^7$ ................................................ H04B 1/38
(52) U.S. Cl. ...................... 375/220; 375/222; 375/260; 370/465
(58) Field of Search ................................ 375/220, 222, 375/223, 260, 261; 370/465

(56) References Cited

U.S. PATENT DOCUMENTS 5,063,574 A * 11/1991 Moose ........................ 375/261
6,266,347 B1 * 7/2001 Amrany et al. ............. 370/478

* cited by examiner

*Primary Examiner*—Don N. Vo
(74) *Attorney, Agent, or Firm*—Rosenman & Colin LLP

(57) ABSTRACT

A digital subscriber line communicating system and a transceiver therein are disclosed. The system or the transceiver comprises: a unit for calculating a bitmap which defines the number of transmissible bits for each carrier signal in each of periodical noise durations and a rate converter for converting a constant rate of an input transmitting data into a rate determined by the bitmap, and for adding, in a predetermined number of the periodical noise durations, dummy bits to the data having the converted rate. The bitmap calculating unit includes: a line quality measuring unit for measuring the quality of the communication line in each of the periodical noise durations, a transmission bit number converter for calculating the number of transmissible bits to be allocated to each carrier to form the bitmap, and a bitmap optimizing unit for minimizing the dummy bits by decreasing the number of the transmissible bits allocated to each carrier signal of the symbols. The decreasing is performed in the order from the number of bits allocated to a carrier with a smaller S/N margin to the number of bits allocated to a carrier with a larger S/N margin.

10 Claims, 12 Drawing Sheets

| CARRIER NO. | NUMBER OF TRANSMISSIBLE BITS | S/N MARGIN (dB) | NUMBER OF TRANSMISSION BITS bi |
|---|---|---|---|
| ⋮ | ⋮ | ⋮ | ⋮ |
| 48 | 5 | 7.8 | 5 |
| 49 | 7 | 6.5 * | 6 |
| 50 | 8 | 7.4 * | 7 |
| 51 | 7 | 6.1 * | 6 |
| 52 | 6 | 9.4 | 6 |
| ⋮ | ⋮ | ⋮ | ⋮ |
| 126 | 4 | 6.5 * | 3 |
| 127 | 2 | 8.0 | 2 |

*: CARRIER WITH SMALL S/N MARGIN

DIGITAL SUBSCRIBER LINE COMMUNICATING SYSTEM AND A TRANSCEIVER IN THE SYSTEM

BACKGROUND OF THE INVENTION

1. Field of the Invention

The present invention relates to a digital subscriber line communicating system and a transceiver in the system which utilize an existing telephone line as a high speed data communication line. More particularly, it relates to an improvement of a modulation/demodulation system in a transmission apparatus used in the above mentioned communication system.

In recent years, multimedia services such as internet and so forth have expanded throughout society and into homes. Accompanied by such development, it has been strongly required to promptly provide an economical and reliable digital subscriber line communicating system for utilizing such services.

2. Description of the Related Art

(1) An Explanation of an ADSL

As a technique to provide a digital subscriber line communicating system which utilizes the existing telephone line as a high speed data communication line, an xDSL (Digital Subscriber Line) is known. xDSL is a communicating system which utilizes a telephone line and a modulation/demodulation technique. xDSLs are generally classified into a symmetric type and an asymmetric type. In the symmetric type, upstream transmission speed from a subscriber home (hereinafter referred to as a remote terminal side or an RT side) to an accommodating central office (hereinafter referred to as a central office side or a CO side) is symmetric with the transmission speed from the central office side to the remote terminal side. In the asymmetric type, the transmission speed from the remote terminal side to the central office side is asymmetric with the transmission speed from the central office side to the remote terminal side.

In the asymmetric xDSLs, there is an Asymmetric DSL (ADSL) modem which is provided with the G.DMT standard having a downstream transmission speed of about 6 Mbit/sec. and the G.lite standard having a downstream transmission speed of about 1.5 bits/sec. Both of the G.DMT and G.lite employ Discrete Multitone (DMT) modulation.

In the prior art, the digital subscriber line communicating system has a problem of long data transmission delay.

SUMMARY OF THE INVENTION

An object of the present invention is to provide a digital sub scriber line transmission system and a transceiver therein in which the data transmission delay amount is suppressed, To attain the above object, there is provided, according to an aspect of the present invention, a digital subscriber line communicating system for communicating modulated symbols between a transmitting side and a receiving side through a communication line, comprising: a bitmap calculating unit, provided in the receiving side, for calculating a bit map which defines the number of transmissible bits for each carrier signal al of the symbols in each of periodical noise durations, the calculated bitmap being sent to and stored in the transmitting side during an initialization period of the communication; and a rate converter, provided in the transmitting side, for converting a constant rate of an input transmitting data into a rate determined by the bitmap, and for adding, in a predetermined number of the periodical noise durations, dummy bits to the data having the converted rate, the dummy bits corresponding to the difference between the rate determined by the bitmap and the constant rate. The bitmap calculating unit includes a line quality measuring unit for measuring the quality of the communication line in each of the periodical noise durations, a transmission bit number converter for calculating the number of transmissible bits to be allocated to each carrier to form the bitmap, and a bitmap optimizing unit for minimizing the dummy bits by decreasing the number of the transmissible bits allocated to each carrier signal of the symbols. The decreasing is performed in the order from the number of bits allocated to a carrier with a smaller S/N margin to the number of bits allocated to a carrier with a larger S/N margin.

After the initialization period, the transmitting side transmits data according to the bitmap optimized in the receiving side and transmitted from the receiving side to the transmitting side.

The subscriber line communicating system according to above mentioned, further comprises a timing signal generating unit for generating the timing signal synchronized with a periodical noise including the periodical noise durations which interfere with the transmitting side and the receiving side, and a sliding window generating unit for generating sliding windows based on the timing signal. 345 continuous modulated symbols including 5 synchronization symbols constitute a hyperframe including 34 of the sliding windows. According to a single bitmap mode in which the symbols are transmitted and received through only insides of the sliding windows, the number of the dummy bits is expressed as:

(a transmitting capacity of data output from the rate converter)−(a transmitting capacity of data input to the rate converter)=(N_bitmap_inside)*(N_inside)−(N_rate)*(340*8)

where "N_bitmap_inside" is the number of bits transmitted per each symbol in each inside of the sliding windows;

"N_inside" is the number of symbols in the insides of the sliding windows per each hyperframe;

"N_rate" is (N_rate*32 kbps)=user data rate;

340*8 is the number of bits in each hyperframe per 32 kbps wherein the dummy bits are minimized by replacing N_rate=int {(Mi*N_inside)/(340*8)} and N_bitmap_inside=int [{(N_rate*340*8) +N_inside_1}/N_inside]

where "int" means to round down to an integer, and "Mi" is number of the transmittable bits calculated by line quality measuring.

According to a dual bitmap mode in which the symbols are transmitted and received through both insides and outsides of the sliding windows, the number of the dummy bits is expressed as:

(a transmitting capacity of data output from the rate converter)−(a transmitting capacity of data input to the rate converter)=(N_bitmap_inside)*(N_inside) +(N_bitmap_outside)*(N_outside)−(N_rate)*(340*8)

where "N_bitmap_inside" is the number of bits transmitted per each symbol in each inside of the sliding windows;

"N_inside" is the number of symbols in the insides of the sliding windows per each hyperframe;

"N_bitmap_outside" is the number of bits transmitted per each symbol in each outside of the sliding windows;

"N_outside" is the number of symbols in the outsides of the sliding windows per each hyperframe;

"N_rate" is (N_rate*32 kbps)=user data rate;

340*8 is the number of bits in each hyperframe per 32 kbps wherein, for example, the dummy bits are minimized by replacing N_rate= int{(Mi*N_inside+Mo*N_outside)/(340*8)} and N_bitmap_outside=Mo N_bitmap_inside =int[{(N_rate*340*8)−N_bitmap_outside* N_outside +N_inside−1}/N_inside]

where "int" means to round down to an integer;

"Mitt" is number of the transmittable bits per each inside symbol calculated by line quality measuring; and "Mo" is number of the transmittable bits per each outside symbol calculated by line quality measuring.

According to another aspect of the present invention, there is provided a transceiver having the same features as in the above-mentioned digital subscriber line communicating system.

Specifically, the conversion delay of the rate converter is given as the sum of the delay caused by the addition of dummy bits and the delay caused by the rate conversion of the data stream corresponding to the sliding window. The present invention is intended to suppress the whole data transmission delay by minimizing each of the delays,

BRIEF DESCRIPTION OF THE DRAWINGS

The above objects and features of the present invention will be more apparent from the following description of the preferred embodiments when read in conjunction with the accompanying drawings, wherein.

DESCRIPTION OF THE PREFERRED EMBODIMENTS

An embodiment of the invention will be explained below with reference to the accompanying drawings.

The explanation that follows refers to a digital subscriber line transmission system (ADSL transmission system) employing the DMT modulation scheme, or especially, the G. lite.

Figure 1A:
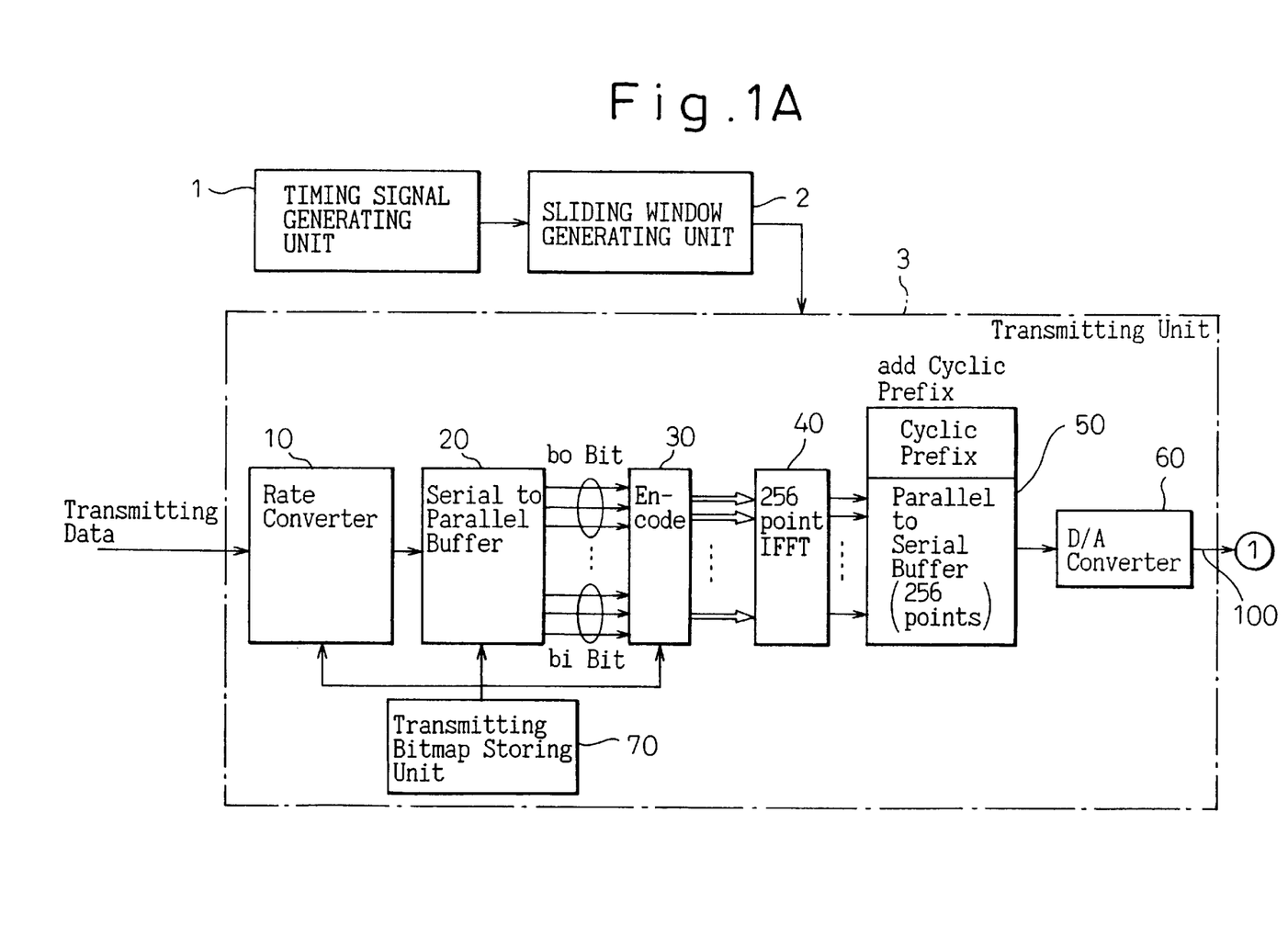
FIGS. 1A and 1B are diagrams showing function blocks of a subscriber line transmission system of DMT modulation type according to an embodiment of the present invention.
Figure 1B:
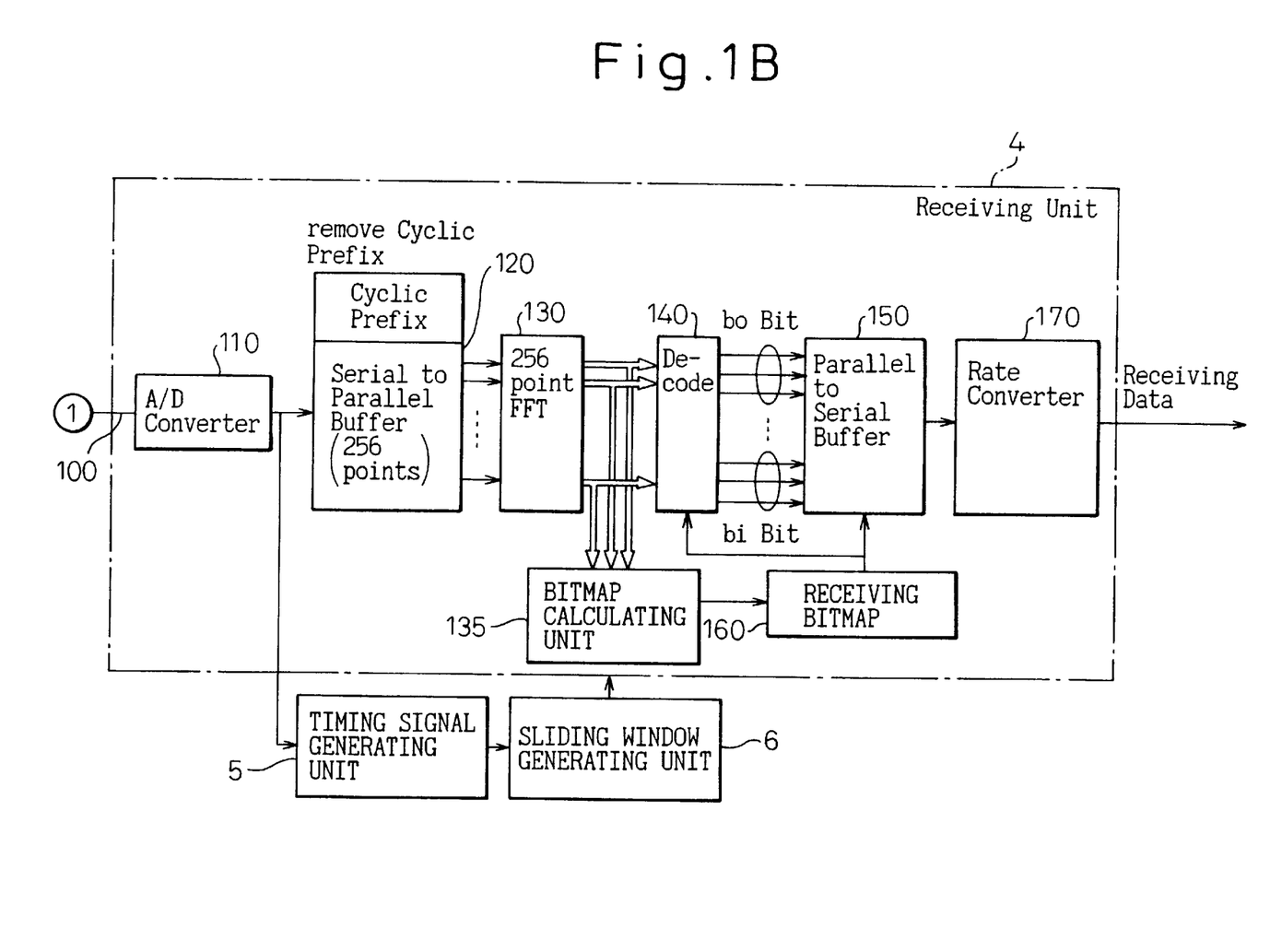

FIG. 1A is a block diagram showing functional blocks of a central office or a transceiver in the central office according to an embodiment of the present invention; and FIG. 1B is a block diagram showing functional blocks of a remote terminal according to an embodiment of the present invention.

As shown in FIG. 1A, the central office includes a timing signal generating unit 1, a sliding window generating unit 2, and a sliding window transmitting unit 3. The sliding window transmitting unit 3 includes a rate converter 10, a serial to parallel buffer 20, an encoder 30, a parallel to serial buffer 50, a D/A converter 60, and a transmitting bitmap storing unit 70.

The timing signal generating unit 1 generates a reference clock signal having a frequency of, for example, 400 Hz, synchronized with a TCM ISDN transmission which interferes with the central office and the remote terminal. The timing signal may be generated based on an external signal or with an internal signal generated by a crystal oscillator as an example.

The sliding window generating unit 2 generates a downstream sliding window from the generated timing clock signal. The downstream sliding window discriminates whether the transmitting DMT symbols are received in a far end cross-talk duration or in the other duration at the remote terminal. The discriminated result is sent to the sliding window transmitting unit 3.

The sliding window transmitting unit 3 transmits the DMT symbols according to the downstream sliding window to the remote terminal.

The rate converter 10 converts an input rate of an input transmitting data into an output rate by adding dummy bits according to a transmitting bitmap stored in the transmitting bitmap storing unit 70.

The bitmap storing unit 70 stores a transmitting bitmap which defines the number of transmissible bits for each carrier signal of the modulated symbols according to the S/N. The transmitting bitmap is sent from the receiving side, i.e., in this case, from the remote terminal.

As shown in FIG. 1B, the remote terminal includes a sliding window receiving unit 4, a timing signal generating unit 5 and a sliding window generating unit 6.

The sliding window receiving unit 4 receives the DMT symbol, according to the downstream sliding window from the central office.

The timing signal generating unit 5 generates the timing signal from received DMT symbols which are transmitted from the central office according to the sliding window.

The sliding window generating unit 6 generates a downstream sliding window from the reference clock signal generated by the timing signal generating unit 5. The generated downstream sliding window defines whether the received DMT symbols are received in a far end cross-talk duration or other duration at the remote terminal.

The timing signal in the central office is synchronized with the transmission system which interferes with the central office and the remote terminal.

According to an embodiment of the present invention, a bitmap calculating unit 135 is provided in the sliding window receiving unit 4.

DMT modulation will be explained using the G.lite as an example and with reference to FIGS. 1A and 1B. This explanation and the associated drawings will describe only the downstream modulation/demodulation from the central office to the remote terminal. However, the DMT modulation is also possible in the upstream direction.

Firstly, transmitting data is input into an ADSL transceiver unit (ATU) in the central office and, after passing through the rate converter 10, a one-symbol time (¼ kHz) of the data is stored in a serial to parallel buffer 20. The stored data are divided into a plurality of groups. A predetermined number of transmission bits b0, . . . , or bi per a carrier signal is previously allocated to each group in accordance with a transmitting bitmap stored in the transmitting bitmap storing unit 70. The transmitting bitmap will be described later in detail. Each group is output to an encoder 30. In the encoder 30, each group of the input bit series is converted into a signal point expressed by a complex number for an orthogonal amplitude modulation and is output to IFFT 40. The IFFT 40 performs the conversion from each of the signal points to transmitting signal sequence by an inverse fast Fourier transform. The signals from the IFFT 40 are output to a parallel to serial buffer 50. Here the sixteen tail points 240–255 of the outputs of the IFFT 40 are added as a Cyclic Prefix to the head of each DMT symbol. The output of the parallel to serial buffer 50 is supplied to a D/A converter 60 in which the digital signal with a sampling frequency of 1.104 MHz is converted into an analog signal. The analog signal is transmitted through a metallic line 100 to a remote terminal.

At the remote terminal side, the analog signal is converted into a digital signal with a sampling frequency of 1.104 MHZ by an A/D converter 110. Each DMT symbol of the digital signal is stored in a serial to parallel buffer 120. In the buffer 120, the Cyclic Prefix is removed from the digital signal, and the remaining signal is output to an FFT 130. In the FFT 130, a fast Fourier transform is effected to generate or demodulate the signal points. The demodulated signal points are decoded by a decoder 140 in accordance with a receiving bitmap stored in the receiving bitmap storing unit 160 the receiving bitmap has the same values as those in the transmitting bitmap. The decoded data are stored in a parallel to serial buffer 150 as receiving data of bit-sequences b0, . . . , and bi.

The rate converter 170 removes the dummy bits from the serial data output from the parallel to serial buffer 150 to output a constant rate data.

In the following, the bitmap, the FEXT and NEXT, the sliding window, an initialization, the minimization of the number of the dummy bits, and averaging out the symbol density in the sliding window will be described.

(1) A Detailed Explanation of the Bitmap

Figure 6A:
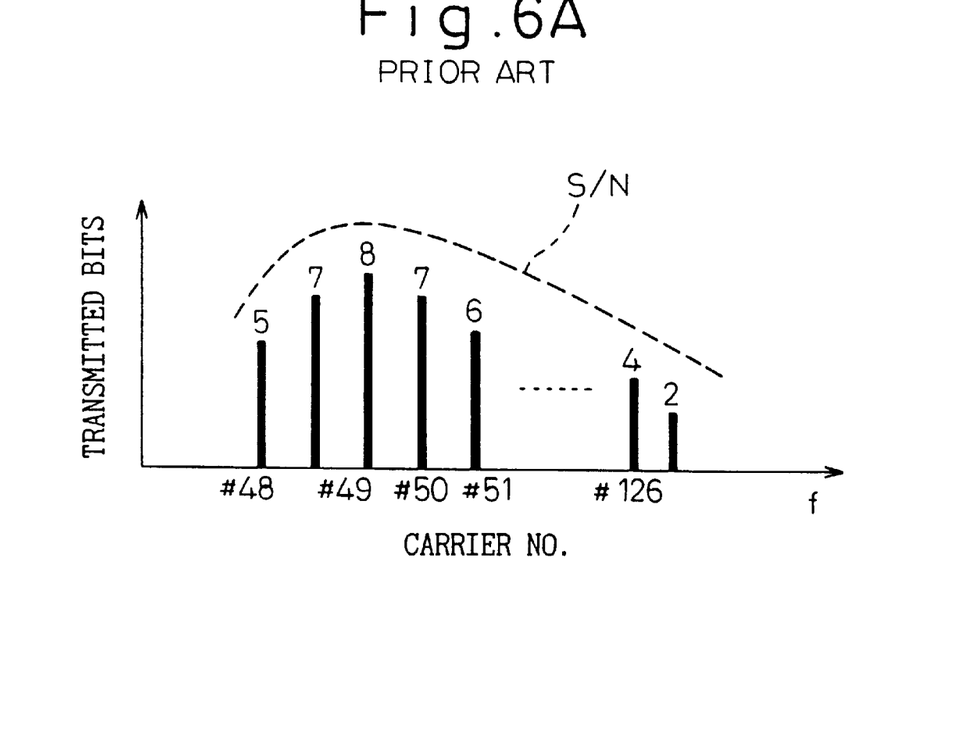
FIGS. 6A and 6B show how to define, in the prior art, the number of bits to be transmitted to obtain a bitmap.
Figure 6B:
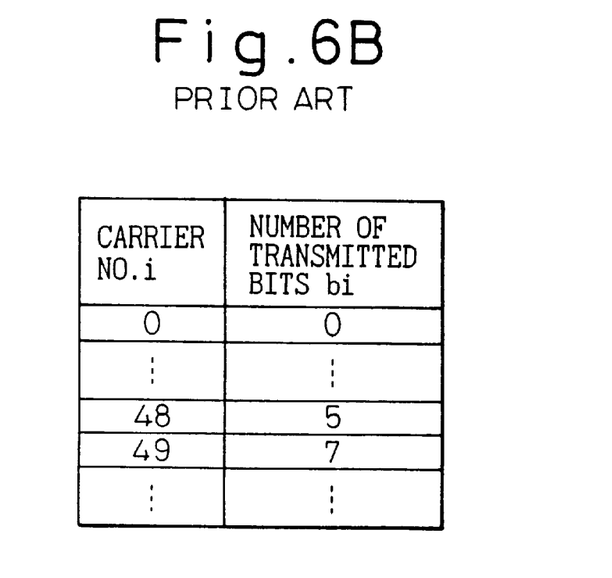

FIGS. 6A and 6B are diagrams showing the definition of the bitmap in the prior art.

The bitmap described in the explanation of the DMT will be explained in detail with reference to FIGS. 6A and 6B.

The apparatus at the central office side and the apparatus at the remote terminal side both measure the ratio of the receiving signal to noise (hereinafter referred to as S/N) during a training period prior to communication to determine the number of bits to be transmitted by each modulating carrier. As shown in FIGS. 6A and 6B, for a carrier signal with a larger S/N, a larger number of bits to be transmitted are allocated; and for a carrier signal with a smaller S/N, a smaller number of bits to be transmitted are allocated.

By the above allocation, the receiving side measures the S/N to prepare the bitmap which indicates the numbers of bits to be transmitted corresponding to the carrier numbers.

The receiving side informs this bitmap to the transmitting side during a training period so that both the transmitting side and the receiving side can perform the modulation/demodulation with the use of the same bitmap during normal data communication.

According to an embodiment of the present invention, this bitmap is modified by decreasing the number of dummy bits, as later described in more detail.

(2) FEXT and NEXT

Figure 2:
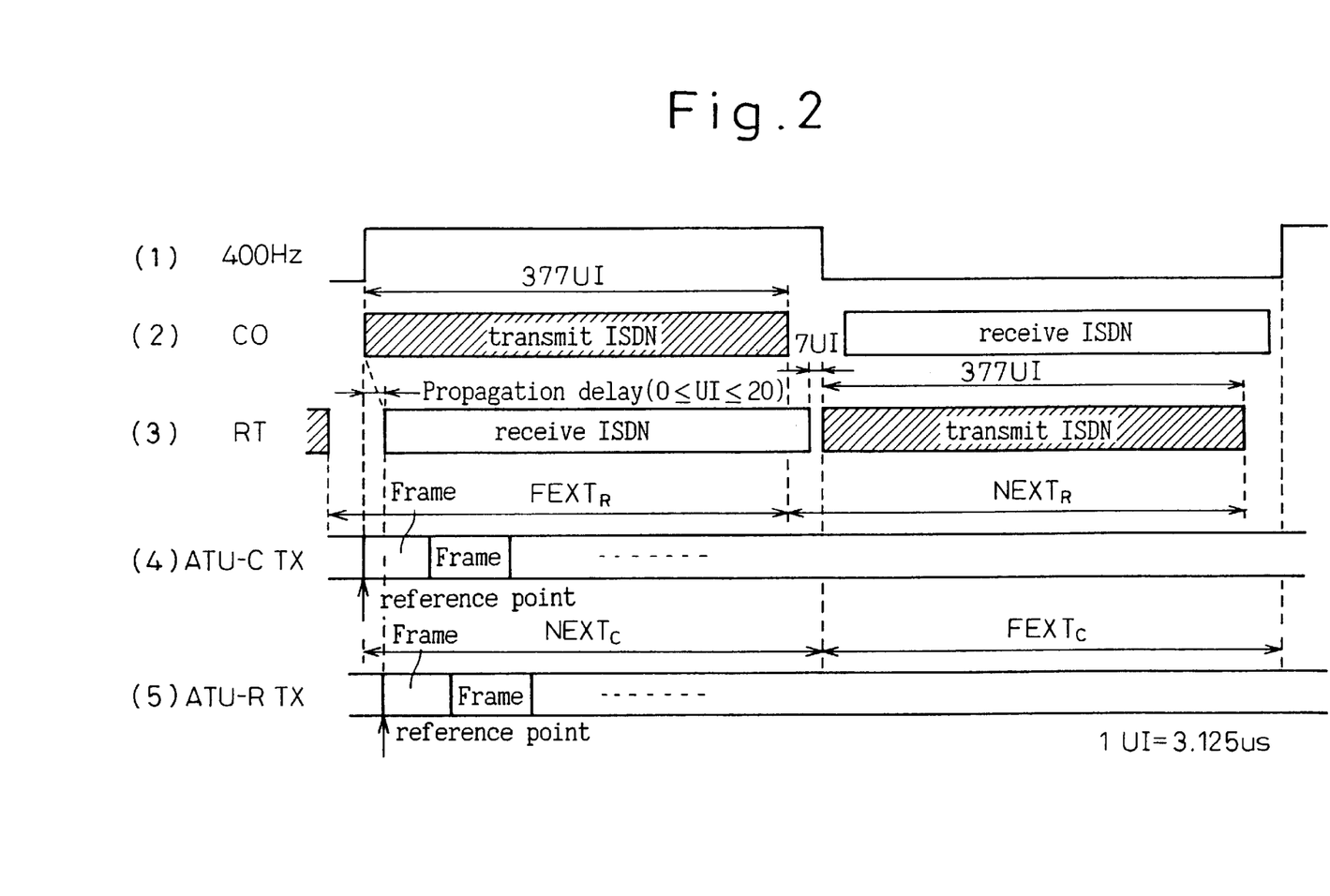
FIG. 2 is a timing chart of the TCM-ISDN cross-talk.

FIG. 2 is a timing chart showing the cross-talk that the ADSL receives from the TCM-ISDN.

The TCM-ISDN transmission is carried out at a frequency of 400 Hz with the period of 2.5 ms as shown in (1) of FIG. 2. During the first half cycle of each period of the TCM-ISDN, the central office (CO) side transmits symbols as shown in (2) of FIG. 2 and during the latter half cycle of the period, the remote terminal (RT) side transmits symbols as shown in (3) of FIG. 2. In the first half cycle of the period of TCM-ISDN, therefore, the center ADSL unit (ATU-C) is affected by the near end cross-talk (NEXT$_C$) from the TCM-ISDN, and in the latter half cycle, the ATU-C is affected by the far end cross-talk (FEXT$_C$) from the TCM-ISDN as shown in (5) of FIG. 2. On the other hand, the subscriber ADSL unit (ATU-R) is affected by the FEXT$_R$ from the TCM-ISDN during the first half cycle of the one TCM-ISDN period, and by the NEXT$_R$ from the TCM-ISDN during the latter half cycle thereof. In this specification, the time areas affected by NEXT and FEXT in this way will be called the NEXT duration and the FEXT duration, respectively as shown in (4) and (5) of FIG. 2.

The center ADSL unit (ATU-C) in the Co side can estimate or define the FEXT$_R$ duration and the NEXT$_R$ duration at the subscriber ADSL unit (ATU-R) in the RT side. Also, the ADSL unit (ATU-R) in the RT can estimate or define the FEXT$_C$ duration and the NEXT$_C$ duration at the center ADSL unit (ATU-C) in the CO. That is, each period is estimated or defined as follows.

FEXT$_R$: FEXT duration at ATU-R estimated by ATU-C
NEXT$_R$: NEXT duration at ATU-R estimated by ATU-C
FEXT$_C$: FEXT duration at ATU-C estimated by ATU-R
NEXT$_C$: NEXT duration at ATU-C estimated by ATU-R
  The transmission delay is also taken into consideration in these definitions.

(3) Sliding Window

Figure 3:
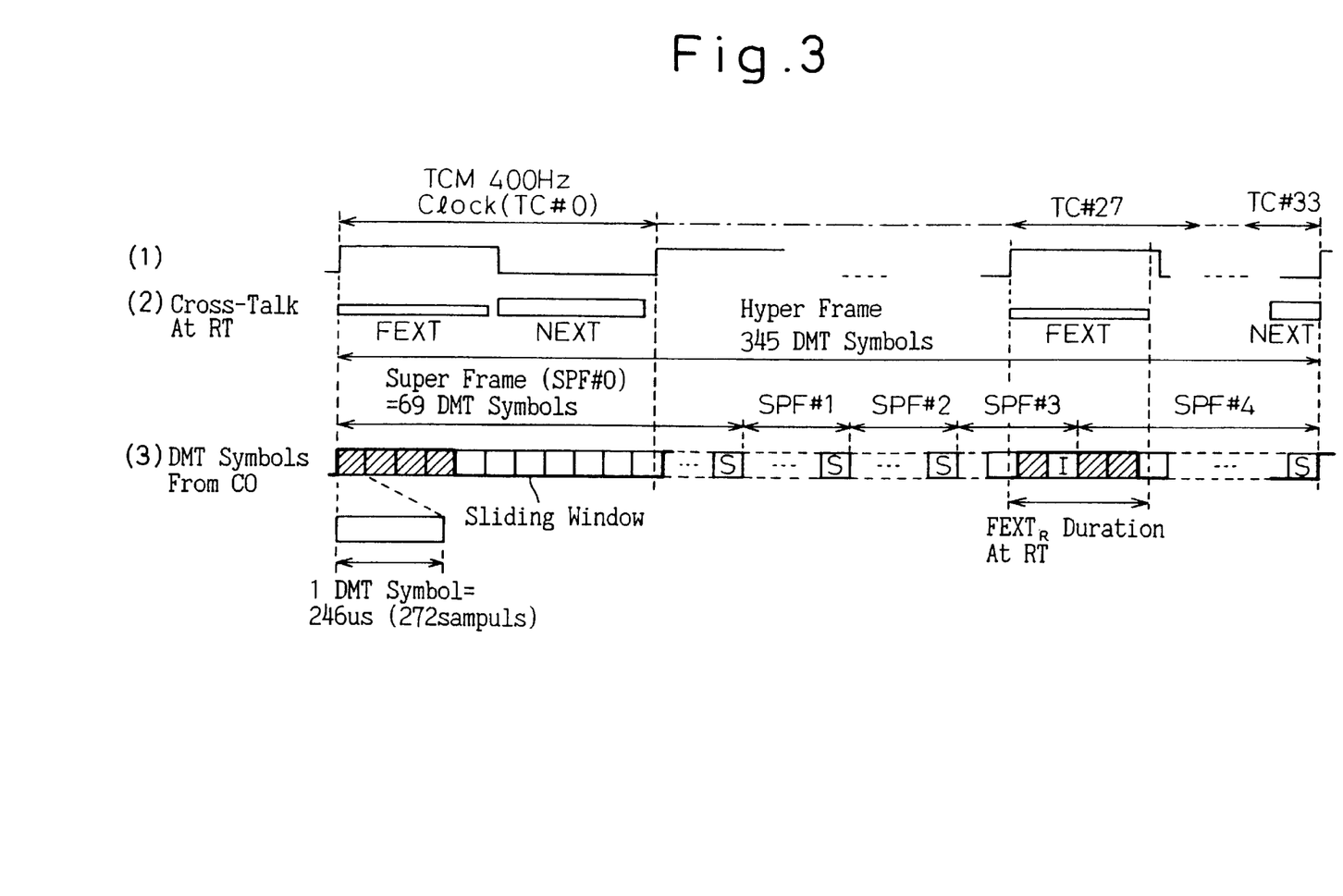
FIG. 3 is a diagram showing a transmission pattern of a sliding window bitmap (SWB) method at the central office side.

FIG. 3 shows a transmission pattern sent from the central office side. The slashed portions in (3) of FIG. 3 indicate the inside symbols.

For the purpose of providing a digital subscriber line transmission system capable of transmitting the ADSL signal in satisfactory manner in the cross-talk environment from the TCM-ISDN described above, the present applicant has earlier proposed to introduce a "sliding window" in Japanese Patent application No. 10-144913 (corresponding to U.S. patent. application Ser. No.: 09/318,445 filed on May 25, 1999) which is incorporated herein by reference.

According to Japanese Patent Application No. 10-144913, in the downstream transmission of the ADSL signal from the center ADSL unit (ATU-C) to the subscriber ADSL unit (ATU-R), the state of the ADSL signal transmitted by the center ADSL unit (ATU-C) in the cross-talk environment from the TCM-ISDN is defined as follows.

That is, in the case where the transmission symbol is completely contained in the $\text{FEXT}_R$ duration, as shown in FIG. 3, the center ADSL unit (ATU-C) transmits the symbols as inside symbols by means of the sliding windows. Also, in the case where the transmission symbols are included in the $\text{NEXT}_R$ durations even partially, the center ADSL unit (ATU-C) transmits the symbols as outside symbols. In the process, the 34 periods of the TCM-ISDN timing signal coincide with the 345 symbol periods of the ADSL. Therefore, the 34 periods of the TCM-ISDN timing signal, i.e., the 345 symbol periods of the ADSL are determined as one period of a hyperframe. Thus, the transmission pattern of the sliding windows is determined with such a hyperframe.

Figure 10:
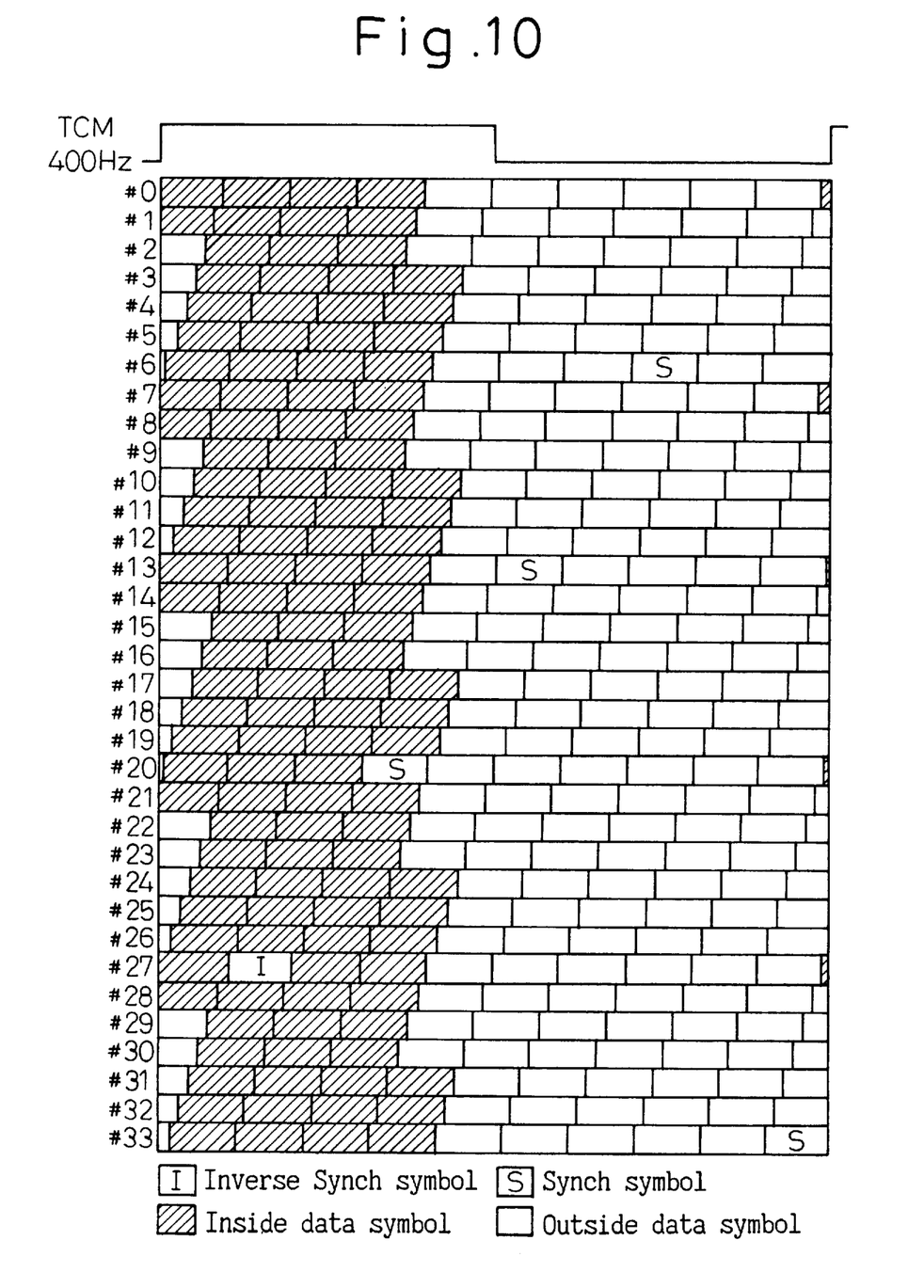
FIG. 10 is a diagram showing one hyperframe of a transmission pattern from the central office according to the SWB method in the prior art.

FIG. 10 shows a hyperframe configured according to such a transmission pattern. In FIG. 10, the 345 symbols constituting the hyperframe are indicated as inside symbols indicated by slashed block portions, outside symbols indicated by white blocks, synchronizing symbols S, and inverse synchronization symbols I.

The center ADSL unit (ATU-C) has two operation modes. One is for transmitting the inside symbols using the bitmap for the $\text{FEXT}_R$ duration and the outside symbols using the bitmap for the $\text{NEXT}_R$ durations. This mode is referred to as a dual bitmap mode (DBM). The other is for transmitting the inside symbols using the bitmap for the $\text{FEXT}_R$ durations and only the synchronizing pilot tone is transmitted through outsides of the sliding windows. This latter mode is referred to as a single bitmap mode (SBM).

Figure 4:
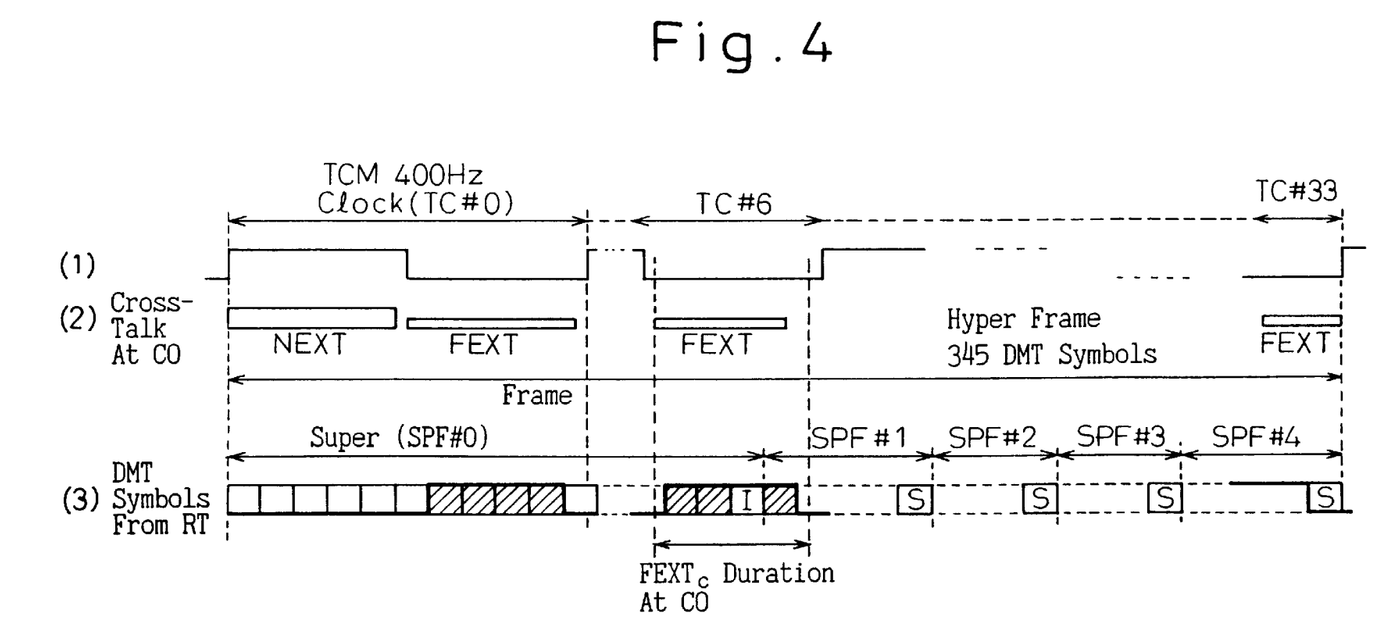
FIG. 4 is a diagram showing a transmission pattern of the SWB method at the remote terminal side.
Figure 5:
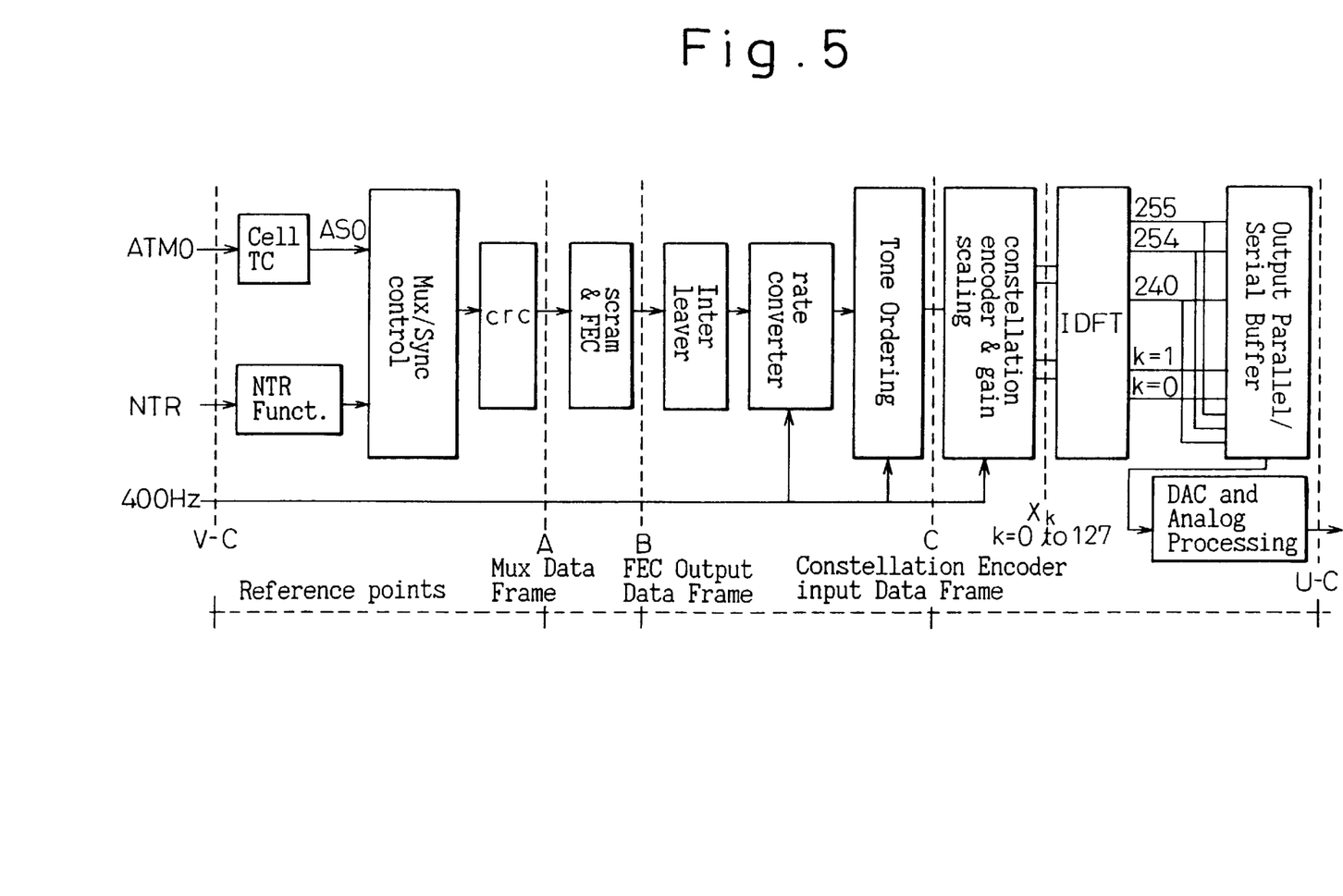
FIG. 5 is a block diagram showing a reference model of the ATU-C transmitter.

FIG. 4 is a diagram showing a subscriber transmission pattern according to the SWB method as an example.

In the upstream transmission, as in the downstream transmission, as shown in FIG. 4, the subscriber ADSL unit (ATU-R) has two operation modes, one for transmitting the inside symbols using the bitmap for the $\text{FEXT}_C$ durations and the outside symbols using the bitmap for the $\text{NEXT}_C$ durations according to the dual bitmap mode, and the other for transmitting the inside symbols using the bitmap for the $\text{FEXT}_C$ durations and nothing outside of the sliding windows according to the single bitmap mode.

(4) Rate Converter

Figure 7:
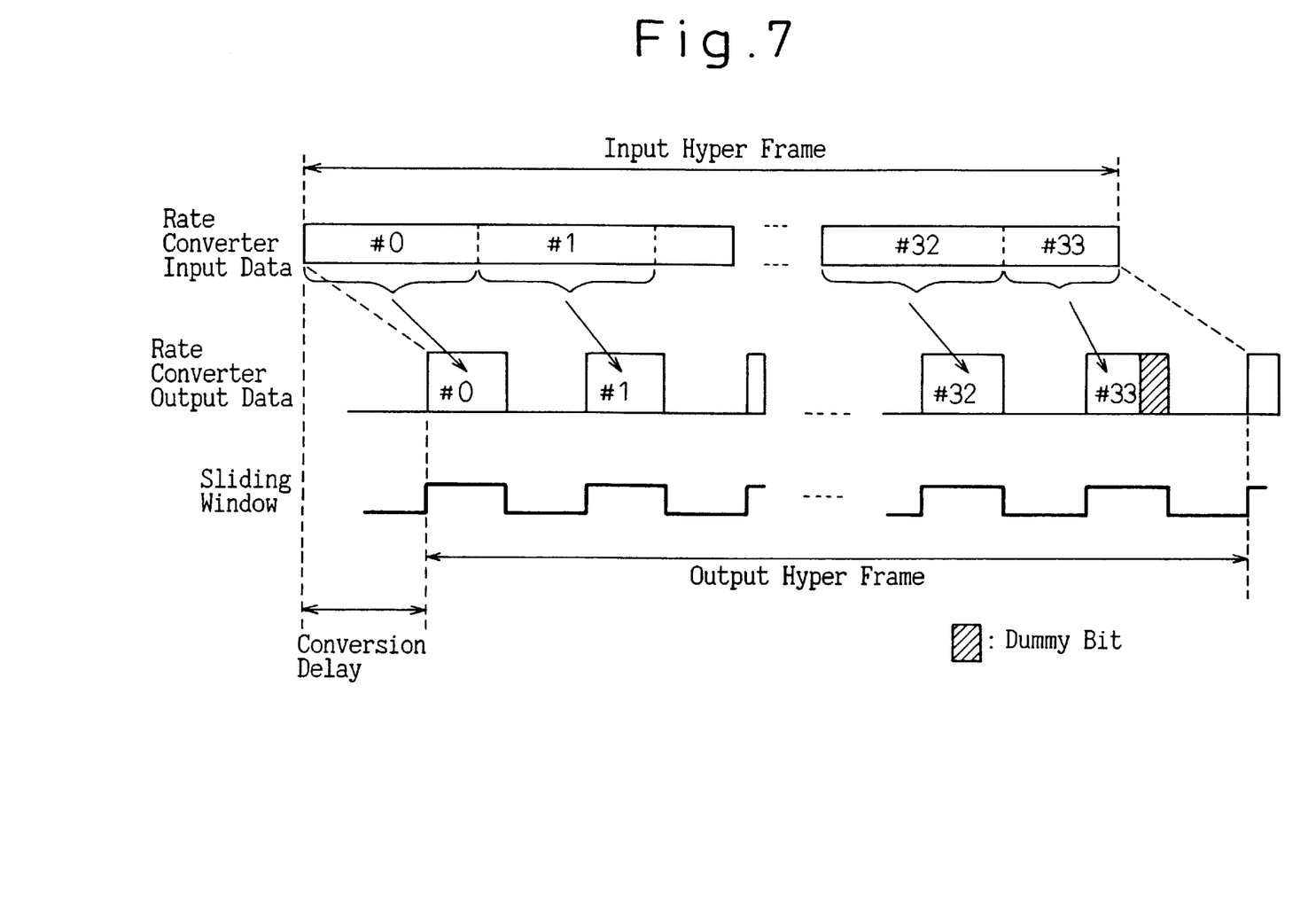
FIG. 7 is a timing chart of the input/output data of a rate converter.

FIG. 7 is an input/output timing chart of the rate converter according to the single bitmap mode (SBM) as an example.

The rate converter 10 in the transmitting side changes the rate of the input transmission data stream into a data stream corresponding to the sliding window. The ADSL transmission unit is required to maintain the user data transmission rate equivalent to an integer multiple of 32 kbps. On the other hand, according to the single bitmap mode, for example, the data transmission rate on the output side is determined by the bitmap of the inside symbols; and according to the dual bitmap mode, the data transmission rate on the output side is determined by the bitmap of both the inside symbols and the outside symbols. In both modes, the dummy bits for the rate adjustment are inserted in the end of the hyperframe. The number of dummy bits in one hyperframe is defined as a difference between an output capacity of transmission per one hyperframe and an input capacity of transmission per one hyperframe, that is, between an output data rate and an input data rate. Thus, according to the dual bitmap mode, the number of dummy bits in one hyperframe is given by the following equation (1):

(a transmitting capacity of data output from the rate converter per hyperframe)−(a transmitting capacity of data input to the rate converter per hyperframe) ={(N_bitmap_inside)*(N_inside) +(N_bitmap_outside)*(N_outside)}−(N_rate)*(340*8)  (1)

where "N_bitmap_inside" is the number of bits transmitted per each symbol in the each inside of the sliding windows (inside symbol);

"N_inside" is the number of inside symbols per hyperframe

"N_rate" is (N_rate*32 kbps)=user data rate

"N_bitmap outside" is the number of bits transmitted per each symbol in each outside of the sliding windows (outside symbol);

"N_outside" is the number of outside symbols per hyperframe; and

"340*8" is the number of bits in hyperframe per 32 kbps.

According to the single bitmap mode, there is no outside symbol so that the equation (1) is rewritten as:

={(N_bitmap inside)*(N_inside)}−(N_rate)*(340*8)  (1)'

It will be understood from the foregoing description and from FIG. 10 that the digital subscriber transmission system has a problem of long data transmission delay.

That is, as can be seen from FIG. 10, the starting points of the FEXT durations are not the same, and the number of symbols in a FEXT duration is not always the same as that in the other FEXT duration.

For example, in the prior half of the hyperframe from #0 to #16, the ratio of 4-symbol FEXT durations and 3-symbol FEXT durations is larger than in the latter half of the hyperframe from #17 to #33.

According to an embodiment of the present invention, the number of the dummy bits is minimized as described below.

(5) Minimization of Number of Dummy Bits

First, an explanation will be given of an example of a digital subscriber line transmission system in which the number of bits transmitted per DMT symbol is determined in such a manner as to minimize the number of dummy bits. This configuration can minimize the conversion delay time due to dummy bits.

Figure 9:
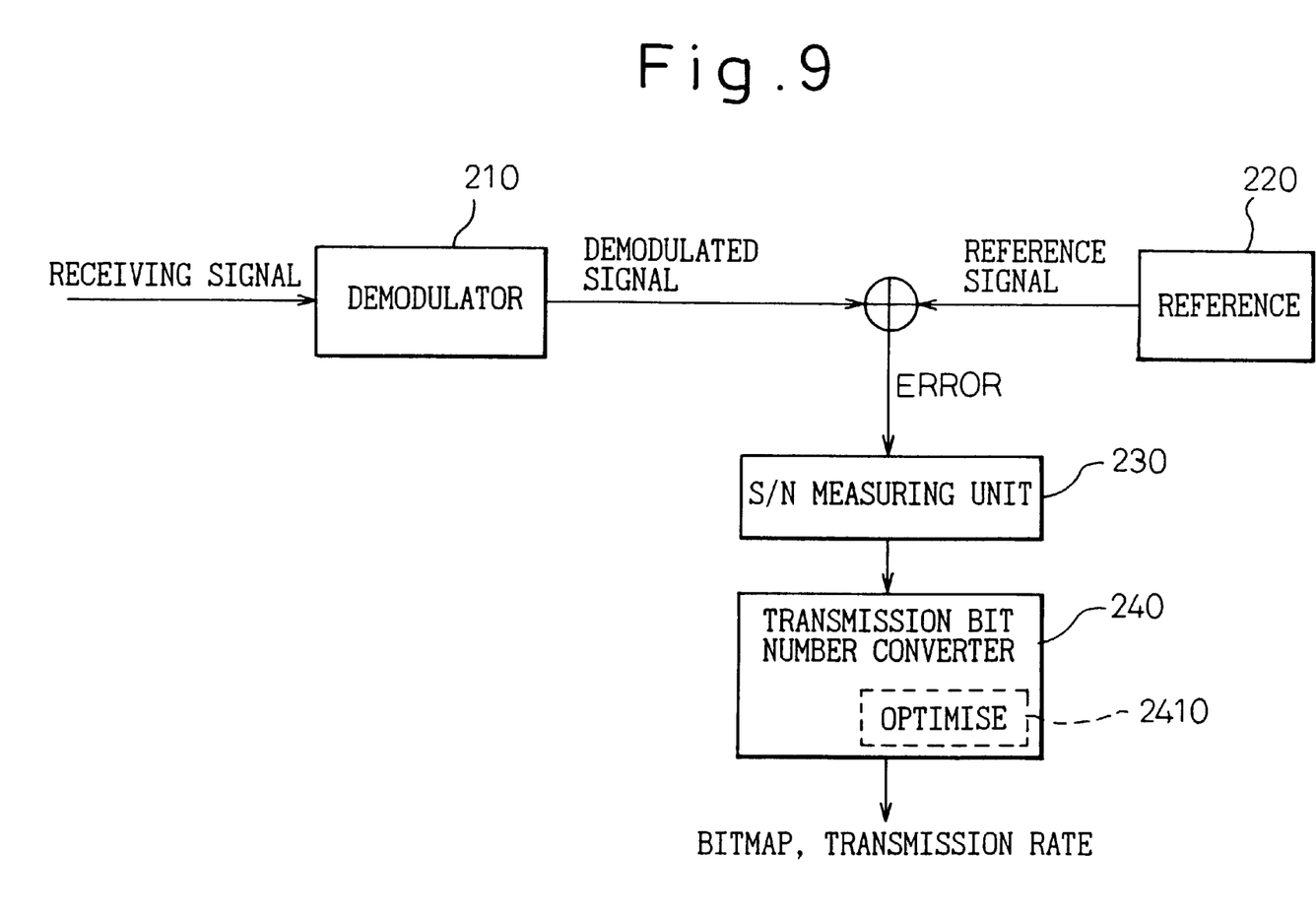
FIG. 9 is a diagram showing an example configuration of a transmission bitmap calculation circuit according to an embodiment of the present invention.

FIG. 9 shows an example configuration of the bitmap calculating circuit 135 in the receiving unit 4 shown in FIG. 1B. In FIG. 9, a receiving signal is demodulated through a demodulator 210 according to the DMT modulation method. The demodulator 210 is the buffer 120 and the FFT 130 in FIG. 1B. A reference signal generated by a reference generating circuit 220 is subtracted from the demodulated signal, to generate an ERROR signal making up a noise component of each carrier. A S/N measuring unit 230 calculates the S/N ratio of each carrier from the input ERROR signal, and applies the result of the calculation to a transmission bit number converter 240. The transmission bit number converter 240 prepares a bitmap by converting the number of bits assigned by the S/N value of each carrier.

According to an embodiment of the present invention, in order to minimize the number of dummy bits, the bitmap is prepared in such a manner as to minimize the number defined in the previously described equation (1) or (1)'

When SBM and Mi is assumed to be the number of transmission bits per symbol that can be transmitted, as determined from the S/N ratio, then the following equation is established:

$$N\_rate=int\{Mi*(N\_inside)/(340*8)\} \text{ (where int means to round down to integer)} \quad (2)$$

Therefore, the value N_bitmap_inside minimizing the dummy bits is given as $$N\_bitmap\_inside=int\{((N\_rate*340*8)+N\_inside-1)/N\_inside)\} \quad (3)$$

Thus, the transmission bit number converter 240 according to the embodiment of the present invention prepares a bitmap satisfying the conditions of the N_rate and the N_bitmap inside defined by the foregoing equations (2) and (3).

As a method of reducing the number M of the transmission bits determined by S/N to N_bitmap_inside defined by the above equation (3), the number of bits allocated to a carrier can be reduced in the order from the number of bits allocated to a carrier with a smaller S/N margin to the number of bits allocated to a carrier with a larger S/N margin.

Figure 8A:
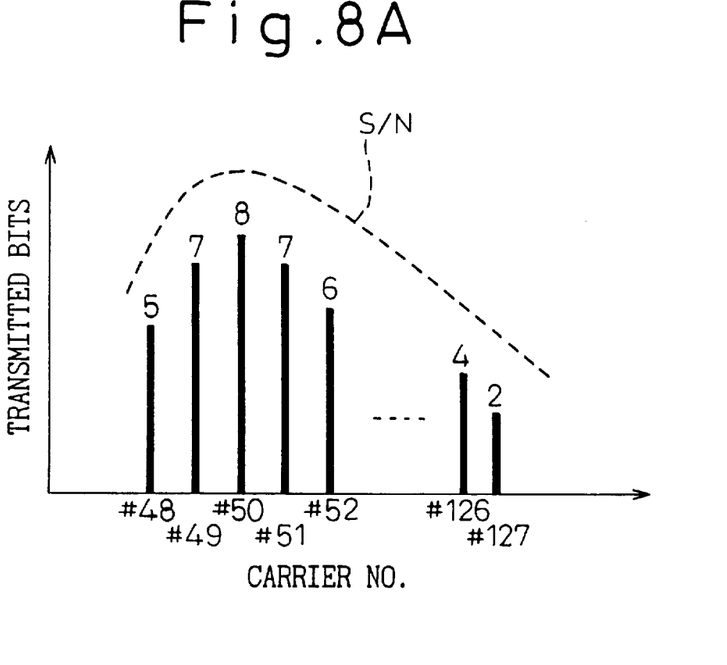
FIGS. 8A and 8B show the method of preparing a bitmap according to an embodiment of the present invention.
Figure 8B:
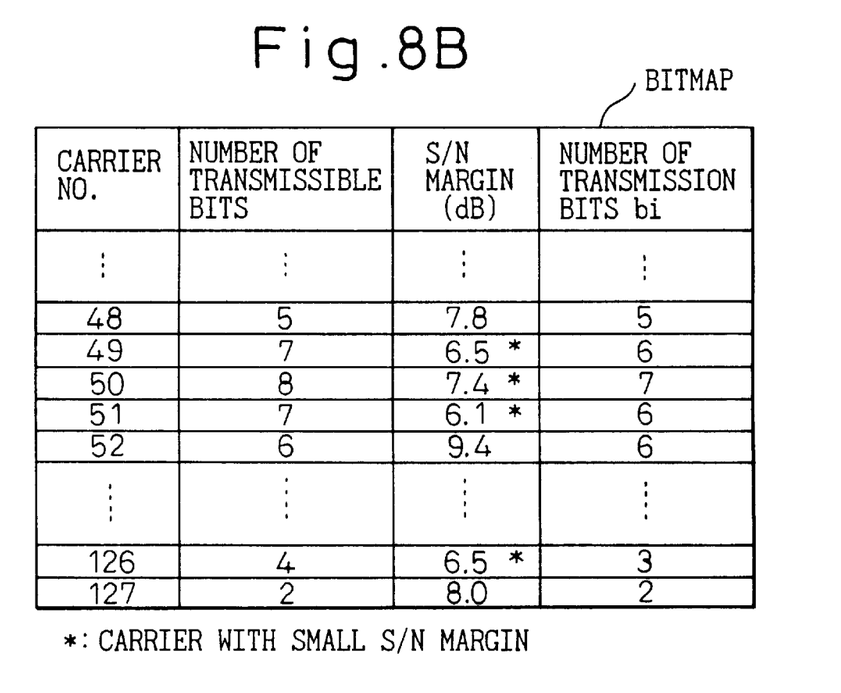

FIGS. 8A and 8B are diagrams showing a method of preparing a bitmap according to an embodiment of the present invention.

The method described above is shown in FIGS. 8A and 8B. Further, the number of allocated bits is reduced sequentially from a carrier with a smaller S/N margin to a carrier with a larger S/N margin, thereby making it possible to improve the noise margin of the transmission system as a whole.

(2) Averaging Out the Symbol Density in Sliding Window

Now, an explanation will be given of an example of a digital subscriber line transmission system in which the position and the number of the synchronization symbols of the sliding window transmission pattern are changed. This configuration can suppress the waiting time for rate conversion by averaging out the density of the inside symbol in the hyperframe.

Figure 11:
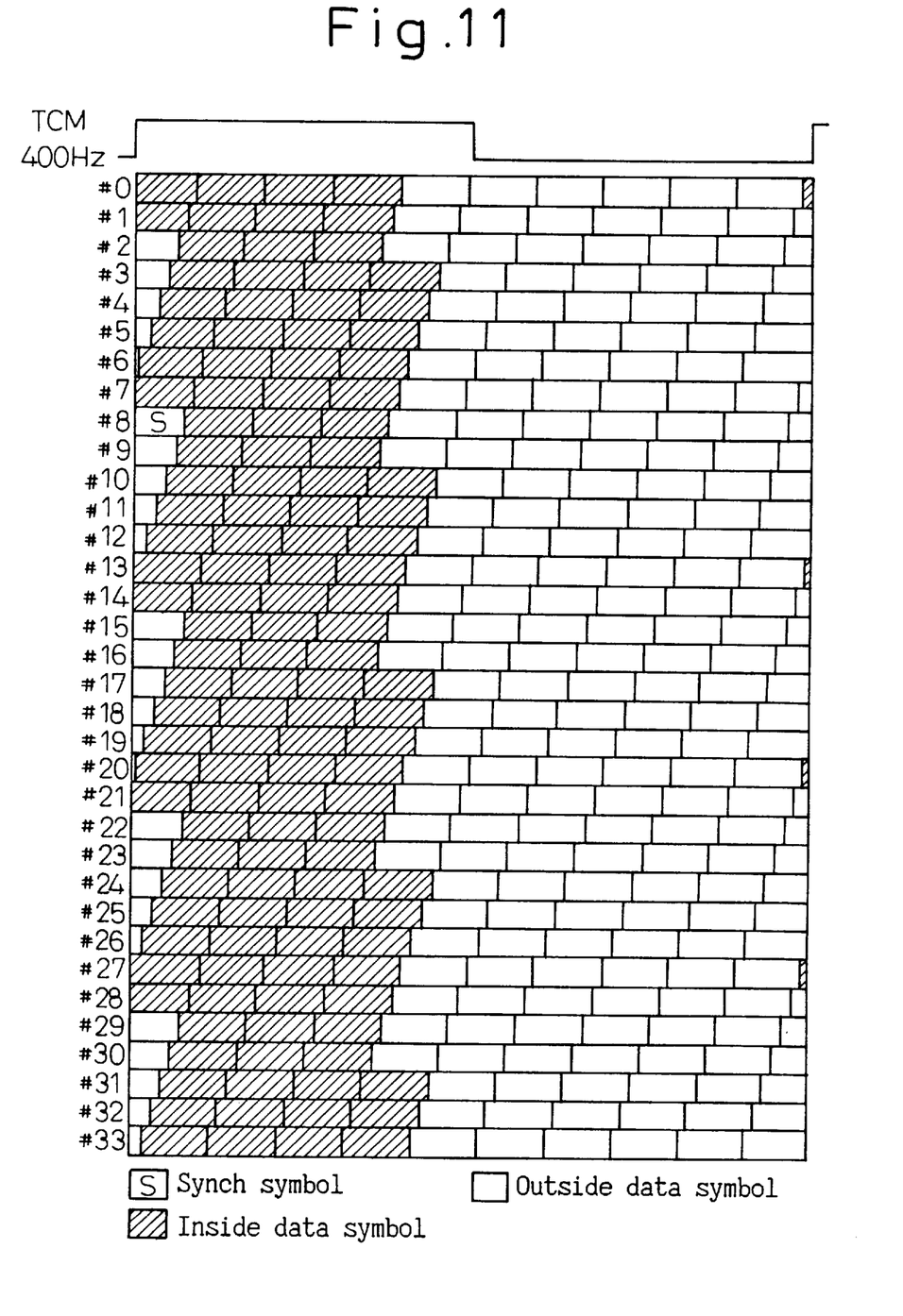
FIG. 11 shows an example of one hyperframe of a transmission pattern from the central office according to an embodiment of the present invention.

FIG. 10 is a diagram showing one hyperframe of a transmission pattern according to the SWB method in the prior art. FIG. 11 shows an example of one hyperframe of a transmission from the central office according to an embodiment of the present invention.

In FIG. 11, an example of the structure of the hyperframe according to the invention is illustrated.

As shown in FIG. 10, in the hyperframe structure of the prior art, the ratio between three and four inside symbols that appear in the hyperframe is varied during the one TCM period. Because of this fluctuation, the conversion delay between the output rate and the input rate of the rate converter 10 was large in the prior art.

In order to avoid this problem, according to an embodiment of the present invention, the density at which the inside symbols appear is averaged out by changing the position and number of the synchronization symbols S in the hyperframe.

As described above in detail, according to the present invention, there is provided a digital subscriber line transmission system and a transceiver therein in which the data transmission delay amount is suppressed.

There is also provided a digital subscriber line transmission system stable in operation which has a large margin against noises by optimizing the bitmap according to the present invention.

What is claimed is:

1. A digital subscriber line communicating system for communicating modulated symbols between a transmitting side and a receiving side through a communication line, comprising:

a bitmap calculating unit, provided in said receiving side, for calculating a bitmap which defines the number of transmissible bits for each carrier signal of said symbols in each of periodical noise durations, the calculated bitmap being sent to and stored in said transmitting side during an initialization period of the communication; and a rate converter, provided in said transmitting side, for converting a constant rate of an input transmitting data into a rate determined by said bitmap, and for adding, in a predetermined number of said periodical noise durations, dummy bits to the data having the converted rate, said dummy bits corresponding to the difference between said rate determined by said bitmap and said constant rate;

said bitmap calculating unit including:
   a line quality measuring unit for measuring the quality of said communication line in each of said periodical noise durations;
   a transmission bit number converter for calculating the number of transmissible bits to be allocated to each carrier to form said bitmap; and
   a bitmap optimizing unit for minimizing said dummy bits by decreasing the number of said transmissible bits allocated to each carrier signal of said symbols.

2. The subscriber line communicating system according to claim 1, wherein, said decreasing is performed in the order from the number of bits allocated to a carrier with a smaller S/N margin to the number of bits allocated to a carrier with a larger S/N margin.

3. The subscriber line communicating system according to claim 1, wherein, after said initialization period, said transmitting side transmits data according to said bitmap optimized in said receiving side and transmitted from said receiving side to said transmitting side.

4. The subscriber line communicating system according to claim 1, further comprising;
   a timing signal generating unit for generating said timing signal synchronized with a periodical noise including said periodical noise durations which interfere with said transmitting side and said receiving side; and
   a sliding window generating unit for generating sliding windows based on said timing signal;
   wherein 345 continuous modulated symbols including 5 synchronization symbols constitute a hyperframe including 34 of said sliding windows; and wherein
   according to a single bitmap mode in which said symbols are transmitted and received through only insides of said sliding windows, the number of said dummy bits is expressed as:
      (a transmitting capacity of data output from said rate converter)-(a transmitting capacity of data input to said rate converter)=(N_bitmap_inside)*(N_inside)-(N_rate)*(340*8)
         where "N_bitmap inside" is the number of bits transmitted per each symbol in each inside of said sliding windows;
         "N_inside" is the number of symbols in the insides of the sliding windows per each hyperframe;
         "N_rate" is (N_rate*32 kbps)=user data rate;
         340*8 is the number of bits in each hyperframe per 32 kbps
         wherein said dummy bits are minimized by replacing
      $N\_rate=int\{(Mi*N\_inside)/(340*8)\}$ and $N\_bitmap\_inside=int[\{(N\_rate*340*8)+N\_inside-1\}/N\_inside]$ where "int" means to round down to an integer; and "Mi" is number of the transmittable bits per each inside symbol calculated by line quality measuring.

5. The subscriber line communicating system according to claim 1, further comprising:

a timing signal generating unit for generating said timing signal synchronized with a periodical noise including said periodical noise durations which interfere with said transmitting side and said receiving side; and a sliding window generating unit for generating sliding windows based on said timing signal;

wherein 345 continuous modulated symbols including 5 synchronization symbols constitute a hyperframe including 34 of said sliding windows; and wherein
according to a dual bitmap mode in which said symbols are transmitted and received through both insides and outsides of said sliding windows, the number of said dummy bits is expressed as:

(a transmitting capacity of data output from said rate converter)–(a transmitting capacity of data input to said rate converter)=(N_bitmap_inside)*(N_inside)+(N_bitmap_outside)* (N_outside)–(N_rate)*(340*8)

where "N_bitmap_inside" is the number of bits transmitted per each symbol in each inside of said sliding windows;

"N_inside" is the number of symbols in the insides of the sliding windows per each hyperframe;

"N_bitmap_outside" is the number of bits transmitted per each symbol in each outside of said sliding windows;

"N_outside" is the number of symbols in the outsides of said sliding windows per each hyperframe;

"N_rate" is (N_rate*32 kbps)=user data rate;

340*8 is the number of bits in each hyperframe per 32 kbps wherein said dummy bits are minimized by replacing N_rate=int{(Mi*N_inside+Mo*N_outside)/(340*8)} and N_bitmap_outside=Mo N_bitmap_inside=int[{(N_rate*340*8)N_bitmap_outside*N_outside+N_inside−1}/N_inside]

where "int" means to round down to an integer;

"Mi" is number of the transmittable bits per each inside symbol calculated by line quality measuring; and "Mo" is number of the transmittable bits per each outside symbol calculated by line quality measuring.

6. A transceiver for communicating modulated symbols through a communication line, said transceiver comprising:

a bitmap calculating unit for calculating a bitmap which defines the number of transmissible bits for each carrier signal of said symbols in each of periodical noise durations, the calculated bitmap being sent to and stored in said transmitting side during an initialization period of the communication; and a rate converter for converting a constant rate of an input transmitting data into a rate determined by said bitmap, and for adding, in a predetermined number of said periodical noise durations, dummy bits to the data having the converted rate, said dummy bits corresponding to the difference between said rate determined by said bitmap and said constant rate;

said bitmap calculating unit including:

a line quality measuring unit for measuring the quality of said communication line in each of periodical noise durations;

a transmission bit number converter for calculating the number of transmissible bits to be allocated to each carrier to form said bitmap; and a bitmap optimizing unit for minimizing said dummy bits by decreasing the number of said transmissible bits allocated to each carrier signal of said symbols.

7. The transceiver according to claim 6, wherein, said decreasing is performed in the order from the number of bits allocated to a carrier with a smaller S/N margin to the number of bits allocated to a carrier with a larger S/N margin.

8. The transceiver according to claim 6, wherein, after said initialization period, said transmitting side transmits data according to said bitmap optimized in said receiving side and transmitted from said receiving side to said transmitting side.

9. The transceiver according to claim 6, further comprising:

a timing signal generating unit for generating said timing signal synchronized with a periodical noise including said periodical noise durations which interfere with said transmitting side and said receiving side; and a sliding window generating unit for generating sliding windows based on said timing signal;

wherein 345 continuous modulated symbols including 5 synchronization symbols constitute a hyperframe including 34 of said sliding windows; and wherein
according to a single bitmap mode in which said symbols are transmitted and received through only insides of said sliding windows, the number of said dummy bits is expressed as:

(a transmitting capacity of data output from said rate converter)–(a transmitting capacity of data input to said rate converter)=(N_bitmap_inside)*(N_inside)–(N_rate)*(340*8)

where "N_bitmap inside" is the number of bits transmitted per each symbol in each inside of said sliding windows;

"N_inside" is the number of symbols in the insides of the sliding windows per each hyperframe;

"N_rate" is (N_rate*32 kbps)=user data rate;

340*8 is the number of bits in each hyperframe per 32 kbps wherein said dummy bits are minimized by replacing N_rate=int{(Mi*N_inside)/(340*8)} and N_bitmap_inside=int[{(N_rate*340*8)+N_inside_1}/N_inside]

where "int" means to round down to an integer; and

"Mi" is number of the transmittable bits per each inside symbol calculated by line quality measuring.

10. The transceiver according to claim 6, further comprising:

a timing signal generating unit for generating said timing signal synchronized with a periodical noise including said periodical noise durations which interfere with said transmitting side and said receiving side; and a sliding window generating unit for generating sliding windows based on said timing signal;

wherein 345 continuous modulated symbols including 5 synchronization symbols constitute a hyperframe including 34 of said sliding windows; and wherein according to a dual bitmap mode in which said symbols are transmitted and received through both insides and outsides of said said sliding windows, the number of said dummy bits is expressed as:

(a transmitting capacity of data output from said rate converter)−(a transmitting capacity of data input to said rate converter)=(N_bitmap_inside)*(N_inside)+(N_bitmap outside)* (N_outside)−(N_rate)*(340*8)

where "N_bitmap_inside" is the number of bits transmitted per each symbol in each inside of said sliding windows;

"N_inside" is the number of symbols in the insides of the sliding windows per each hyperframe;

"N_bitmap_outside" is the number of bits transmitted per each symbol in each outside of said sliding windows;

"N_outside" is the number of symbols in the outsides of said sliding windows per each hyperframe;

"N_rate" is (N_rate*32 kbps)=user data rate;

340*8 is the number of bits in each hyperframe per 32 kbps wherein said dummy bits are minimized by replacing N_rate=int{(Mi*N_inside+Mo*N_outside)/(340*8)} and N_bitmap_outside=Mo N_bitmap_inside=int[{(N_rate*340*8)−N_bitmap_outside*N_outside+N_inside−1}/N_inside]

where "int" means to round down to an integer;

"Mi" is number of the transmittable bits per each inside symbol calculated by line quality measuring; and "Mo" is number of the transmittable bits per each outside symbol calculated by line quality measuring.

* * * * *